US012804533B2

(12) United States Patent
Panje et al.

(10) Patent No.: US 12,804,533 B2
(45) Date of Patent: Nov. 17, 2026

(54) ACCESS POINT DEVICE FOR ESTABLISHING AN INITIAL BACKHAUL CONNECTION

(71) Applicant: Thomson Licensing, Cesson-Sevigne (FR)

(72) Inventors: Krishna Prasad Panje, Bengaluru (IN); Lakshmi Arunkumar, Bangalore (IN); David F. Brumbaugh, Collegeville, PA (US)

(73) Assignee: Thomson Licensing, Cesson-Sevigne (FR)

( * ) Notice: Subject to any disclaimer, the term of this patent is extended or adjusted under 35 U.S.C. 154(b) by 500 days.

(21) Appl. No.: 18/376,548

(22) Filed: Oct. 4, 2023

(65) Prior Publication Data

US 2024/0114447 A1 Apr. 4, 2024

Related U.S. Application Data

(60) Provisional application No. 63/412,951, filed on Oct. 4, 2022.

(51) Int. Cl.

| | |
|---|---|
| ***H04W 48/20*** | (2009.01) |
| ***H04W 24/02*** | (2009.01) |
| ***H04W 48/16*** | (2009.01) |
| ***H04W 76/10*** | (2018.01) |
| ***H04W 88/08*** | (2009.01) |

(52) U.S. Cl.
CPC .......... *H04W 48/20* (2013.01); *H04W 24/02* (2013.01); *H04W 48/16* (2013.01); *H04W 76/10* (2018.02); *H04W 88/08* (2013.01)

(58) Field of Classification Search
CPC ..... H04W 48/20; H04W 24/02; H04W 48/16; H04W 76/10; H04W 88/08
See application file for complete search history.

(56) References Cited

U.S. PATENT DOCUMENTS

2022/0109622 A1* 4/2022 Yeh ......................... H04L 67/10

* cited by examiner

*Primary Examiner* — Diane D Mizrahi
(74) *Attorney, Agent, or Firm* — James Shead; David Todd Shoneman; Michael A. Pugel

(57) ABSTRACT

Configuration of a main access point device (APD) requires an amount of time that can cause a user to incorrectly assume that that issues have arisen during configuration. The amount of time can be due in part to the APD determining a backhaul connection for use with an EAPD, for example, a satellite APD. The APD can determine an initial backhaul connection for use during the configuration. This initial backhaul connection can be based, for example, on one or more default configuration parameters. The APD can proceed with configuration using the initial backhaul connection. The APD can send a configuration notification to a client device associated with the user that informs the user, for example, that the configuration is completed and that a backhaul optimization is being performed. In this way, the user is informed of the status of the configuration such that costs and resources can be conserved.

20 Claims, 5 Drawing Sheets

ACCESS POINT DEVICE FOR ESTABLISHING AN INITIAL BACKHAUL CONNECTION

BACKGROUND

Companies are increasingly providing Multiple Access Point (MAP) architecture or Home Network Controller (HNC) and/or mesh type of wireless fidelity (Wi-Fi®) management, with multiple access point devices and/or extender access point devices within the network to improve Quality of Experience (QoE) of the user by offering extended coverage with seamless roaming. Generally, the access point device upon initialization requires a significant amount of time to establish connections and to perform a configuration based on one or more configuration parameters. Such a delay in the configuration of the access point device can cause a user to incorrectly assume that there is an issue with the configuration or set up the access point device. Thus, there is a need to provide for an initial backhaul connection to be established between the access point device and the extender access point device so that a user can be notified that the configuration is proceeding or completed.

SUMMARY

According to aspects of the present disclosure there are provided novel solutions for establishing a BH connection between an access point device and a network device, for example, an extender access point device of any of a local area network (LAN), a wireless local area network (WLAN), or a personal area network (PAN), or any combination thereof and to complete at least an initial phase of a configuration of an access point device based on one or more configuration parameters. The aspects of the present disclosure provide features that enhance the quality of experience of a user by providing an initial backhaul (BH) connection between access point devices and one or more network devices, for example, an extender access point device (such as a wireless extender access point devices (Wi-Fi® access points)) and at a later time optimizing the BH connection so as to provide a more efficient configuration of the one or more network devices.

Typically, access point devices (APD) and extender access point devices (EAPD) can be set up or configured so as to establish a network within a network environment. The APD and the EAPD establish a dedicated BH connection for mesh management and internet connection. The mesh network provides a set of fronthaul (FH) SSIDs for client devices for seamless connectivity. Several network devices offer any combination of 2G, 5G, 6G, etc. radios. For example, a network device can use the 5G or the 6G radio of the network device for a dedicated BH channel due to higher throughput.

Issues arise when a network device, for example, an APD and/or an EAPD, experiences an initialization, such as a power on sequence, a boot up sequence (such as an initial boot sequence or a re-boot sequence), a software update, a firmware update, any other initialization, or any combination thereof. During initialization, the network device can take a significant period of time, such as several minutes, for configuration of the network device to be completed. For example, onboarding or configuring an APD can take more than seven minutes with such onboarding involving APD to EAPD BH connection and synching of latest configuration on APD and EAPD through one or more configuration settings received from a network resource. Almost fifty percent of this period time, for example, more than three minutes, can be attributed to the APD selecting a suitable channel for the BH radio to establish a connection with an EAPD for best BH performance. This channel selection is normally a Wi-Fi® driver feature which involves scanning the environment (for example, to gather interference, utilization, existing operating channel of the APD, and signal strength) to determine the best channel within a radio frequency. During this period of time a user can incorrectly assume that there are issues, such as that the network device is not operating properly or that the configuration has failed. Such issues can result in increased costs and use of valuable resources. Thus, one or more aspects of the present invention provide for onboarding or configuring a network device by selecting an initial BH connection and then performing an optimizing after sending a configuration notification to the client device associated with a user so as to hasten the onboarding/configuration of the network device without sacrificing the BH performance.

An aspect of the present disclosure provides a main APD for establishing a backhaul connection to a satellite APD in a network. The main APD comprises a memory storing one or more computer-readable instructions and a processor configured to execute the one or more computer-readable instructions stored on the memory to cause the main APD to begin configuration of the main APD based on an event, determine an initial backhaul channel for use in establishing a backhaul connection with the satellite APD, establish the initial backhaul connection, and send a configuration notification to a client device based on a status of the configuration.

In an aspect of the present disclosure, the processor is further configured to execute the one or more computer-readable instructions to cause the main APD to receive one or more configuration parameters from a network resource.

In an aspect of the present disclosure, the processor is further configured to execute the one or more computer-readable instructions to cause the main APD to perform backhaul optimization and apply one or more fronthaul configurations of the one or more configuration parameters after sending the configuration notification.

In an aspect of the present disclosure, the performing the backhaul optimization comprises determining an optimized backhaul channel based on one or more network performance parameters.

In an aspect of the present disclosure, the initial backhaul channel is different from the optimized backhaul channel.

In an aspect of the present disclosure, the determining the initial backhaul channel comprises receiving one or more default configuration parameters, and determining the initial backhaul channel based on at least one of the one or more default configuration parameters.

In an aspect of the present disclosure, the one or more default configuration parameters comprise an initial radio for establishing the backhaul connection.

An aspect of the present disclosure provides a method for a main access point device (APD) to establish a backhaul connection to a satellite APD in a network. The method comprises beginning configuration of the main APD based on an event, determining an initial backhaul channel for use in establishing a backhaul connection with the satellite APD, establishing the initial backhaul connection, and sending a configuration notification to a client device based on a status of the configuration.

In an aspect of the present disclosure, the method further comprising receiving one or more configuration parameters from a network resource.

In an aspect of the present disclosure, the method further comprising performing backhaul optimization and apply one or more fronthaul configurations of the one or more configuration parameters after sending the configuration notification.

In an aspect of the present disclosure, the method such that the performing the backhaul optimization comprises determining an optimized backhaul channel based on one or more network performance parameters.

In an aspect of the present disclosure, the method such that the initial backhaul channel is different from the initial backhaul channel.

In an aspect of the present disclosure, the determining the initial backhaul channel comprises receiving one or more default configuration parameters, and determining the initial backhaul channel based on at least one of the one or more default configuration parameters.

In an aspect of the present disclosure, the method such that the one or more default configuration parameters comprise an initial radio for establishing the backhaul connection.

An aspect of the present disclosure provides a non-transitory computer readable medium for controlling access to one or more network resources. The program when executed by a processor of the network device, causes the network device to perform one or more operations including the steps of the methods described above.

Thus, according to various aspects of the present disclosure described herein, it is possible to determine that a BH connection between a access point device and an extender access point device should be established using an initial or default frequency band while the FH connection between the access point device and other network devices should be established using a different or higher frequency band. Such a novel solution will significantly enhance the installation and configuration of a network, such as a home/residential network, that includes access point devices, wireless access point devices (Wi-Fi® APs), HNC devices, wireless routers, mesh networking nodes (for example, Wi-Fi® mesh systems, such as EasyMesh), any other network devices, or a combination thereof. In particular, the novel solution provides improvements for BH association and FH association so as to provide an optimal network environment configuration.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

According to one or more novel aspects of the present disclosure, instead of a main APD determining the best BH channel which consumes time, first a dedicated BH is established on a predetermined radio frequency between a main APD and a satellite APD, such as an EAPD. Once the BH is established, the one or more configuration parameters are received by the main APD. For example, the best BH channel can be computed by the main APD after the initial configuration, after the main APD is configured or onboarded with the one or more configuration parameters and a notification is sent to a client device associated with a user or at any time after the main APD is configured.

Figure 1:
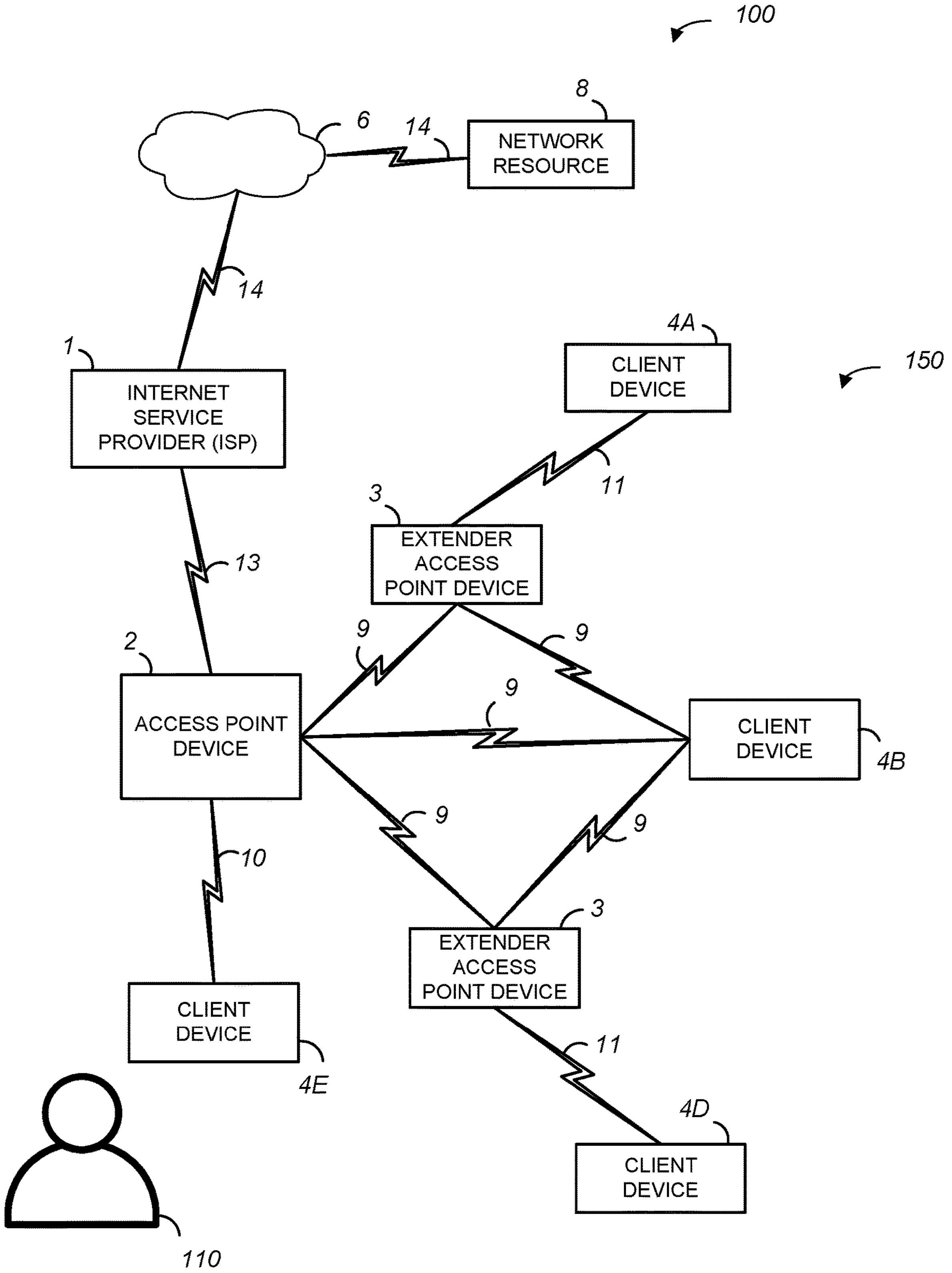
FIG. 1 is a schematic diagram of a network environment, according to one or more aspects of the present disclosure.

FIG. 1 is a schematic diagram of a network environment 100, according to one or more example embodiments. It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the network environment 100 comprises a network resource 8 connected to Internet 6 and an access point device 2, for example, a main APD, connected to the Internet 6 via an Internet Service Provider (ISP) 1 and also connected to different network devices such as one or more wireless extender access point devices 3, for example, a satellite APD, and one or more client devices 4A-4E, collectively referred to as client device(s) 4. The network 150 shown in FIG. 1 includes network devices (for example, an access point device 2, an extender access point device 3 and a client device 4) that may be connected in one or more wireless networks (for example, private, guest, iControl, backhaul network, or Internet of things (IoT) network) within the network 150. Additionally, there could be some overlap between network devices (for example, extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 of network environment 100 can be for connecting the access point device 2 to the Internet 6. The network resource 8 can be any type of network device and/or network repository that provides one or more network configuration parameters to the APD 2. The connection 14 between the Internet 6 and the ISP 1 and between the Internet 6 and network resource 8 and the connection 13 between the ISP 1 and the APD 2 can be implemented using a wide area network (WAN), a virtual private network (VPN), metropolitan area networks (MANs), system area networks (SANs), a data over cable service interface specification (DOCSIS) network, a fiber optics network (for example, FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, 6G, etc. network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP®) Long Term Evolution (LTE®), 5G, or 6G protocols. It is also contemplated by the present disclosure that connection 13 is capable of providing connections between the access point device 2 and a WAN, a LAN, a VPN, MANS, PANs, WLANs, SANS, a DOCSIS network, a fiber optics network (for example, FTTH, FTTX, or HFC), a PSDN, a global Telex network, or a 2G, 3G, 4G, 5G, or 6G network, for example.

The APD 2 can be, for example, an access point and/or a hardware electronic device that may be a combination modem and gateway that combines the functions of a modem, an access point (AP), and/or a router for providing content received from the ISP 1 to network devices (for example, one or more wireless EAPDs 3 and one or more client devices 4) in the network 150. It is also contemplated by the present disclosure that the APD 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The APD 2 may also be referred to as a residential gateway, a home network gateway, or a wireless access point (AP). The APD 2 can include a controller. The controller can select an initial channel for a BH connection to one or more EAPDs 3.

The connection 9 between the access point device 2, the wireless extender access point devices 3, and client devices 4 can be implemented using a wireless connection in accordance with any IEEE 802.11 Wi-Fi® protocols, Bluetooth® protocols, Bluetooth® low energy (BLE), or other short range protocols that operate in accordance with a wireless technology standard for exchanging data over short distances using any licensed or unlicensed band such as the citizens broadband radio service (CBRS) band, 2.4 GHz band, 5 GHz band, 6 GHz band, or 60 GHz band. Additionally, the connection 9 can be implemented using a wireless connection that operates in accordance with, but is not limited to, RF4CE protocol, ZigBee® protocol, Z-Wave® protocol, or IEEE 802.15.4 protocol. It is also contemplated by the present disclosure that the connection 9 can include connections to a media over coax (MoCA) network. One or more of the connections 9 can also be a wired Ethernet connection. Any one or more of the connections 9 can carry information on any of one or more channels of a frequency band that are available for use.

The EAPDs 3 can be, for example, wireless hardware electronic devices such as access points, extenders, repeaters, etc. used to extend the wireless network by receiving the signals transmitted by the access point device 2 and rebroadcasting the signals to, for example, client devices 4, which may out of range of the access point device 2. The extender access point devices 3 can also receive signals from the client devices 4 and rebroadcast the signals to the access point device 2, or other client devices 4.

The connection 11 between the EAPDs 3 and the client devices 4 are implemented through a wireless connection that operates in accordance with any IEEE 802.11 Wi-Fi® protocols, Bluetooth® protocols, BLE, or other short range protocols that operate in accordance with a wireless technology standard for exchanging data over short distances using any licensed or unlicensed band such as the CBRS band, 2.4 GHz band, 5 GHz band, 6 GHz band, or 60 GHz band. Additionally, the connection 11 can be implemented using a wireless connection that operates in accordance with, but is not limited to, RF4CE protocol, ZigBee® protocol, Z-Wave® protocol, or IEEE 802.15.4 protocol. Also, one or more of the connections 11 can be a wired Ethernet connection. Any one or more connections 11 can carry information on any one or more channels 11A that are available for use.

The client devices 4 can be any type of network device that connects to an APD 2, an EAPD 3, or both, for example, hand-held computing devices, personal computers, electronic tablets, mobile phones, smart phones, smart speakers, Internet-of-Things (IoT) devices, iControl® devices, portable music players with smart capabilities capable of connecting to the Internet, cellular networks, and interconnecting with other devices via Wi-Fi® and Bluetooth®, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. For example, a client device 4E can be a mobile phone associated with a user 110 and capable of receiving one or more configuration notifications from the APD 2 regarding the configuration of the APD 2. In one or more embodiments, the client device 4E can initiate a configuration or onboarding of the APD 2.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (for example, FTTH, FTTX, or HFC), a PSDN, a global Telex network, or a 2G, 3G, 4G, 5G, 6G, etc. network, for example.

The connection 10 can also be implemented using a wireless connection in accordance with Bluetooth® protocols, BLE, or other short range protocols that operate in accordance with a wireless technology standard for exchanging data over short distances using any licensed or unlicensed band such as the CBRS band, 2.4 GHz band, 5 GHz band, 6 GHz band, or 60 GHz band. One or more of the connections 10 can also be a wired Ethernet connection.

Figure 2:
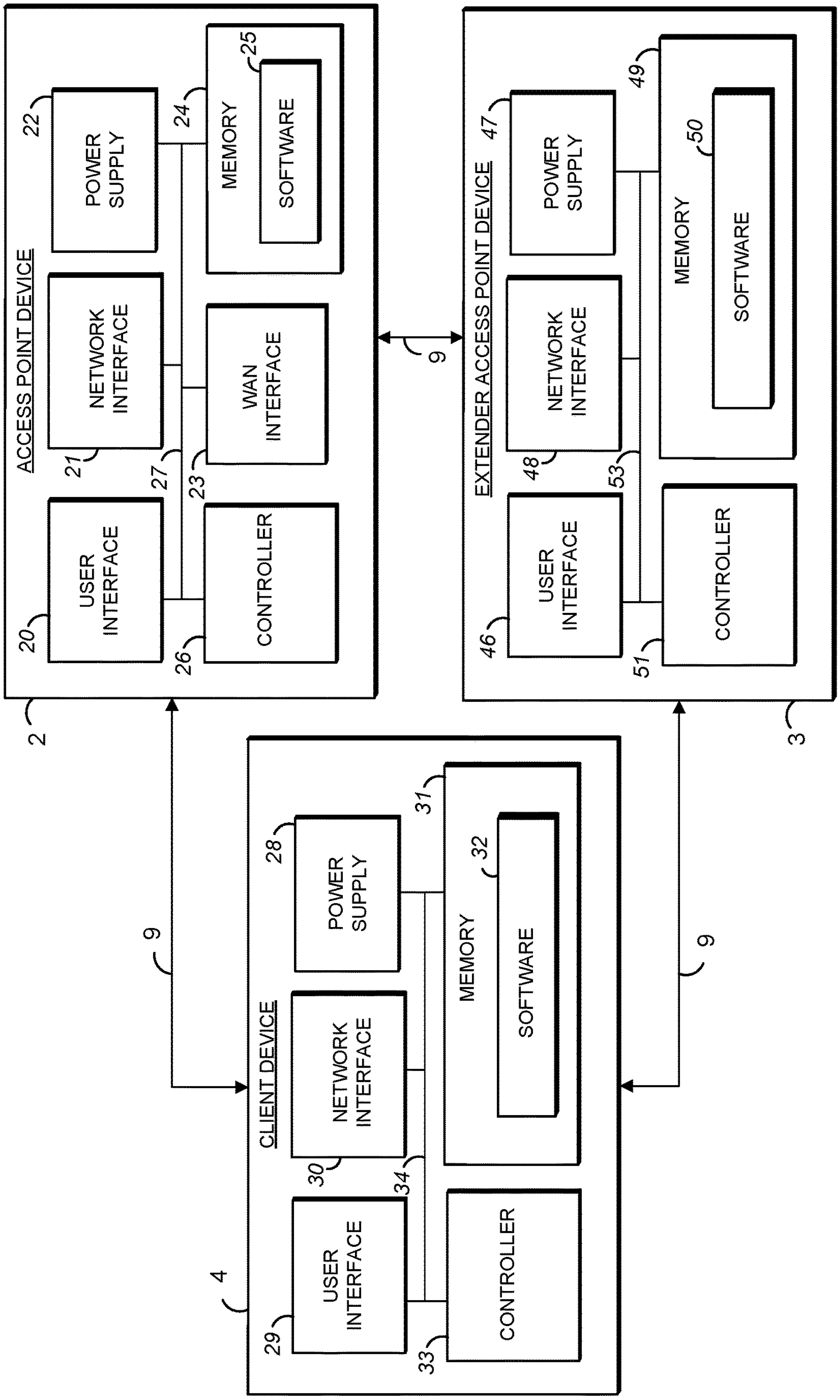
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the APD 2, the one or more EAPDs 3, and the one or more client devices 4 shown in FIG. 1 will be provided in the discussion of FIG. 2. However, in general, it is contemplated by the present disclosure that the APD 2, the one or more EAPD 3, and the one or more client devices 4 include electronic components or electronic computing devices operable to receive, transmit, process, store, and/or manage data and information associated with the network 150 and/or network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the APD 2, the one or more EAPDs 3, and the one or more client devices 4 may be adapted to execute any operating system, including Linux, UNIX, Windows, MacOS, DOS, and Chrome OS as well as virtual machines adapted to virtualize execution of a particular operating system, including customized and proprietary operating systems. The APD 2, the one or more EAPDs 3, and the one or more client devices 4 are further equipped with components to facilitate communication with other network devices over the one or more network connections to local and wide area networks, wireless and wired networks, public and private networks, and any other communication network enabling communication in the network 150 and/or network environment 100.

FIG. 2 is a more detailed block diagram illustrating various components of an exemplary APD 2, a client device 4, and a EAPD 3 implemented in the network 150 of FIG. 1, according to some example embodiments.

Although FIG. 2 only shows one EAPD 3 and one client device 4, the EAPD 3 and the client device 4 shown in the figure are meant to be representative of the other EAPDs 3 and client devices 4 of a network system, for example, system 100 shown in FIG. 1. Similarly, the connections 9 between the APD 2, the EAPD 3, and the client device 4 shown in FIG. 2 are meant to be exemplary connections and are not meant to indicate all possible connections between the APDs 2, EAPDs 3, and client devices 4. Additionally, it is contemplated by the present disclosure that the number of APDs 2, EAPDs 3, and client devices 4 is not limited to the number of APDs 2, EAPDs 3, and client devices 4 shown in FIGS. 1 and 2.

Now referring to FIG. 2, the client device 4 can be, for example, a computer, a portable device, an electronic tablet, an e-reader, a PDA, a mobile phone such as a smart phone, a smart speaker, an IoT device, an iControl® device, portable music player with smart capabilities capable of connecting to the Internet, cellular networks, and interconnecting with other devices via Wi-Fi® and Bluetooth®, or other wireless hand-held consumer electronic device capable of receiving one or more configuration notifications from APD 2.

As shown in FIG. 2, the client device 4 includes a power supply 28, a user interface 29, a network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (for example, either directly or by way of another network device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the access point device 2 and the extender access point device 3 using the communication protocols in accordance with connection 9 (for example, as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is an electronic device, such as a mobile phone, and software 32 includes one or more instructions for establishing a FH connection with the access point device 2.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (for example, 28-31 and 33) of the client device 4 may be established using an internal bus 34.

The EAPD 3 can be, for example, any wireless hardware electronic device used to extend a wireless network by receiving the signals transmitted by the APD 2 and rebroadcasting the signals to a client device 4, which may be out of range of the APD 2 including, but not limited to, a wireless extender, a repeater, and/or an access point. The EAPD 3 can also receive signals from any one or more of the client devices 4 and rebroadcast the signals to the APD 2, or any other one or more client devices 4.

As shown in FIG. 2, the EAPD 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the EAPD 3. The power supply 47 supplies power to the internal components of the EAPD 3 through the internal bus 53. The power supply 47 can be connected to an electrical outlet (for example, either directly or indirectly by way of another device) via a cable or wire.

The network interface 48 can include various network cards, interfaces, and circuitry implemented in software and/or hardware to enable communications with the client device 4 and the APD 2 using the communication protocols in accordance with connection 9 (for example, as described with reference to FIG. 1). For example, the network interface 48 can include multiple radios or sets of radios (for example, a 2.4 GHz radio, one or more 5 GHz radios, and/or a 6 GHz radio), which may also be referred to as wireless local area network (WLAN) interfaces. One radio or set of radios (for example, 5 GHz and/or 6 GHz radio(s)) provides a BH connection between the EAPD 3 and the APD 2, and optionally other EAPD(s) 3. Another radio or set of radios (for example, 2.4 GHz, 5 GHz, and/or 6 GHz radio(s)) provides a fronthaul (FH) connection between the EAPD 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the EAPD 3 in accordance with the embodiments described in the present disclosure.

The controller 51 controls the general operations of the EAPD 3 and can include, but is not limited to, a CPU, a hardware microprocessor, a hardware processor, a multi-core processor, a single core processor, an FPGA, a micro-controller, an ASIC, a DSP, or other similar processing device capable of executing any type of instructions, algorithms, or software for controlling the operation and functions of the EAPD 3 in accordance with the embodiments described in the present disclosure. General communication between the components (for example, 46-49 and 51) of the EAPD 3 may be established using the internal bus 53.

The APD 2 can be, for example, a hardware electronic device that can combine one or more functions of any of a modem, a gateway, an access point (AP), a router, or combinations thereof for providing content received from the content provider (ISP) 1 to network or wireless devices (for example, extender access point devices 3, client devices 4) in the network 150. It is also contemplated by the present disclosure that the APD 2 can include the function of, but is not limited to, an IP/QAM STB or SMD that is capable of decoding audio/video content, and playing OTT or MSO provided content. As shown in FIG. 2, the APD 2 includes a user interface 20, a network interface 21, a power supply 22, a wide area network (WAN) interface 23, a memory 24, and a controller 26. The user interface 20 can include, but is not limited to, push buttons, a keyboard, a keypad, an LCD, a TFT, an LED, an HD or other similar display device including a display device having touch screen capabilities so as to allow interaction between a user and the access point device 2, for example, so as to provide one or more configuration notifications to a user.

The network interface 21 may include various network cards, and circuitry implemented in software and/or hardware to enable communications with the extender access point device 3 and the client device 4 using the communication protocols in accordance with connection 9 (for example, as described with reference to FIG. 1). Additionally, the various network cards, interfaces, and circuitry of the network interface 21 enable communications with a client device 4 (for example, a mobile device) using the one or more communication protocols in accordance with connection 10 (for example, as described with reference to FIG. 1). For example, the network interface 21 can include an Ethernet port (also referred to as a LAN interface) and multiple radios or sets of radios (for example, a 2.4 GHz radio, one or more 5 GHz radios, a 6 GHz radio, and/or any other radio also referred to as WLAN interfaces). One radio (and/or set of radios) (for example, 5 GHz and/or 6 GHz radio(s)) provides a BH connection between the APD 2 and the EAPD(s) 3. Another radio (and/or set of radios) (for example, 2.4 GHz, 5 GHz, 6 GHz, and/or other radio(s)) provides a FH connection between the APD 2 and one or more client device(s) 4.

The power supply 22 supplies power to the internal components of the APD 2 through the internal bus 27. The power supply 22 can be connected to an electrical outlet (for example, either directly or by way of another device) via a cable or wire. The wide area network (WAN) interface 23 may include various network cards, and circuitry implemented in software and/or hardware to enable communications between the APD 2 and the ISP 1 using the wired and/or wireless protocols in accordance with connection 13 (for example, as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the 2 and performing configuration and communication functions related to one or more network devices (network resource 8, EAPDs 3 and client devices 4) in the network in accordance with the embodiments described in the present disclosure (for example, including establishing a BH prior to configuration of the APD 2, according to one or more example embodiments of the present disclosure).

The controller 26 controls the general operations of the APD 2 as well as performs configuration and connection functions related to one or more network devices (network resource 8, one or more EAPDs 3 and client device 4) in the network. The controller 26 can include, but is not limited to, a central processing unit (CPU), a network controller, a hardware microprocessor, a hardware processor, a multi-core processor, a single core processor, a FPGA, a micro-controller, an ASIC, a DSP, or other similar processing device capable of executing any type of computer-readable instructions, algorithms, or software including the software 25 for controlling the operation and functions of the APD 2 in accordance with the embodiments described in the present disclosure. Communication between the components (for example, 20-24, and 26) of the APD 2 may be established using the internal bus 27. The controller 26 may also be referred to as a processor, generally.

Figure 3:
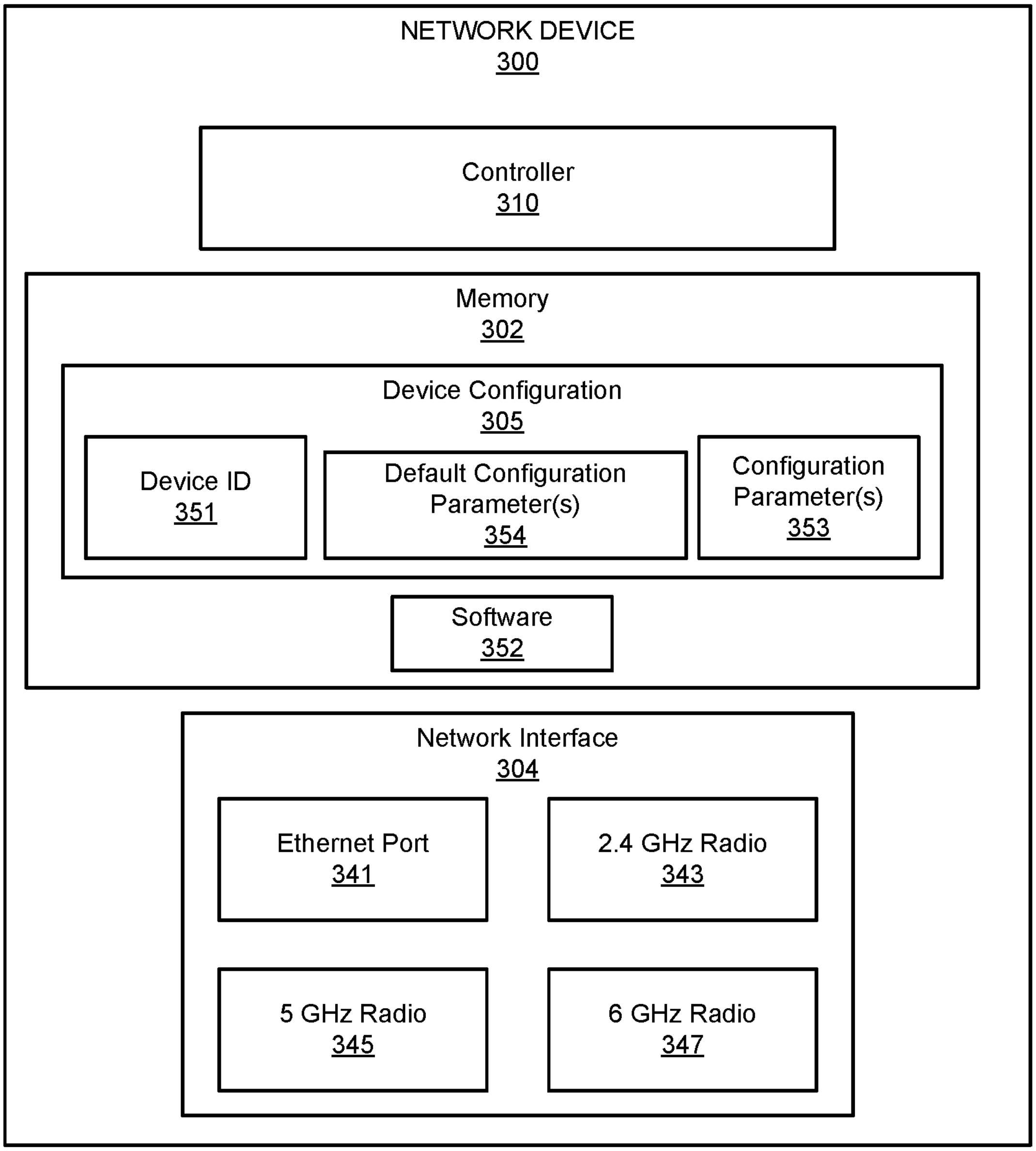
FIG. 3 is a more detailed block diagram illustrating certain components of an exemplary network device implemented in of FIGS. 1-2, according to one or more aspects of the present disclosure.

FIG. 3 is a more detailed block diagram illustrating certain components of an exemplary network device 300, for example, an APD 2, according to one or more aspects of the present disclosure. As shown in FIG. 3, the network device 300 includes the network interface 304, for example, similar to or the same as network interface 21, the memory 302, for example, similar to or the same as network memory 24, and the controller (processor) 310, for example, similar to or the same as controller 26. The network interface 304 includes an Ethernet port 341 (for example, a wired LAN interface), a 2.4 GHz radio 343 (associated with a 2.4 GHz band), a 5 GHz radio 345 (associated with a 5 GHz band), a 6 GHz radio 347 (associated with a 6 GHz band), and/or any other radio associated with any other frequency band (for example, wireless LAN interfaces, or WLAN interfaces). The network device 300 may communicate with the local area network devices (for example, the one or more EAPDs 3 and/or the one or more client devices 4) of a system, for example, network 150 of FIG. 1, via one or more of the Ethernet port 341, and/or one or more radios. However, some other example embodiments of inventive concepts of the present disclosure are not limited to these interfaces only (for example, the techniques may be applied with a 6 GHz radio, higher frequency band radio and/or other similar future developed technologies). As mentioned above, according to aspects of the present disclosure, one radio or set of radios can operate as a BH radio to provide a BH connection between the APD 2 and the one or more EAPDs 3, while another radio or set of radios can provide a FH connection between the APD 2 and one or more network devices, such as one or more the client devices 4.

The memory 302 stores one or more computer-readable instructions, for example, a software or application 352 and a device configuration 305. A device configuration 305 can store one or more configuration parameters 353 associated with a device identifier (ID) 351 of the network device 300. The one or more configuration parameters 353 can comprise one or more fronthaul parameters, such as any of SSID, one or more encryption parameters, one or more credentials, a channel number, a frequency band capability or radio support of the network device 300, or any combination thereof. The device ID 351 can comprise a unique identifier for a network device 300.

The controller 310 can be or include a processor that is configured to access the memory 302. If, for example, the network device 300 is an APD 2, a controller 26 can determine a frequency band for a BH connection, a frequency band for a FH connection, or both (for example, via execution of software, such as software 25) according to one or more aspects of the present disclosure. For example, the memory 302 can store a one or more default configuration parameters 354 for establishing a BH connection to an EAPD 3 without requiring the completion of the configuration first. The processor of the controller 26 also controls communications with the network or wireless devices (for example, the one or more EAPDs 3 and/or the one or more the client devices 4) via the Ethernet port 341, the 2.4 GHz radio 343, the 5 GHz radio 345, the 6 GHz radio 347, and/or any combination thereof in accordance with embodiments described in the present disclosure. The controller 26 can determine which radio or frequency band should be used for the BH connection prior to completion of the configuration of the network device 300. For example, an APD 2 can use one or more default configuration parameters 354 to establish a backhaul connection to an EAPD 2 prior to onboarding or configuring of the APD 2. In one or more embodiments, the one or more default configuration parameters 354 are part of or included within the one or more configuration parameters 353.

Figure 4:
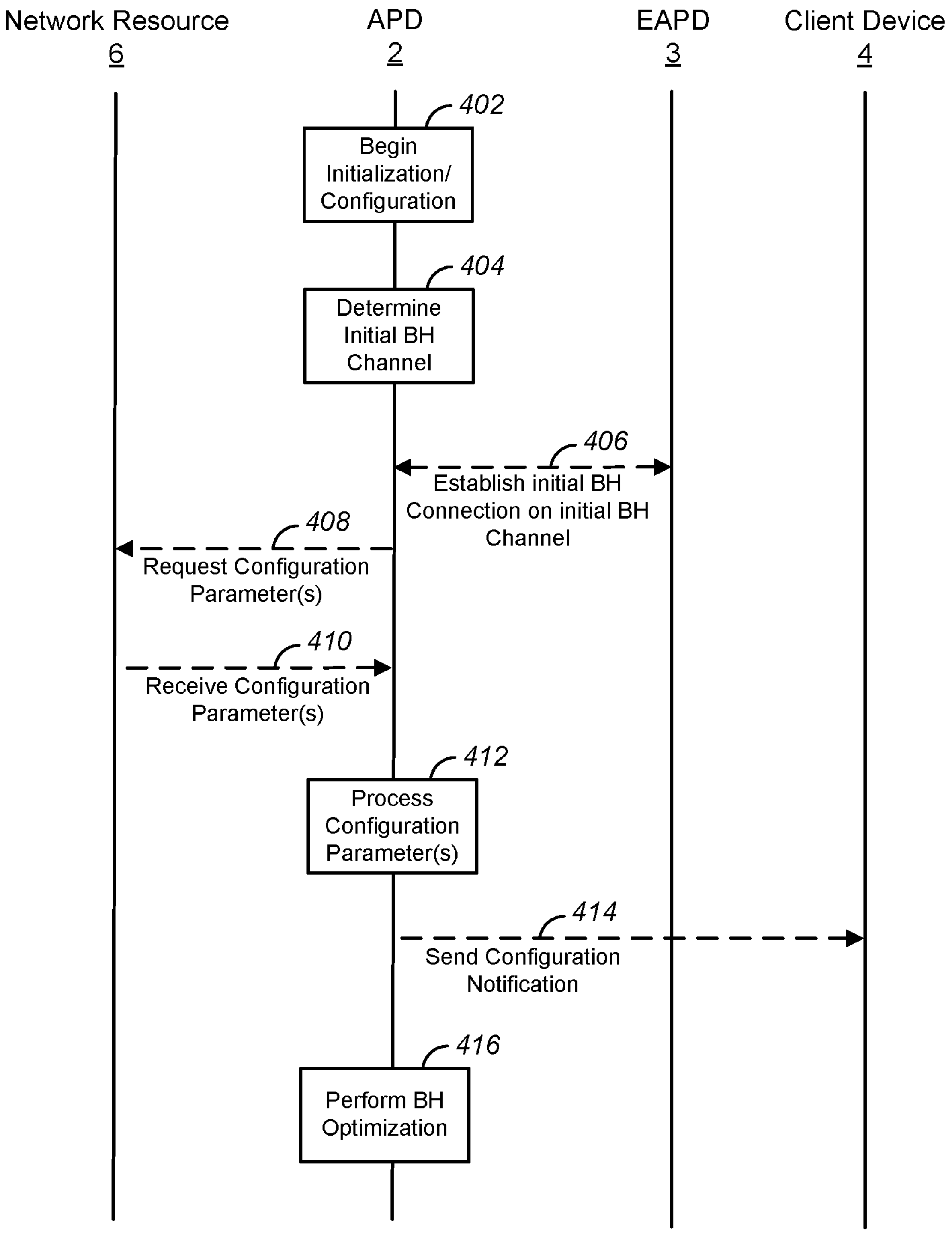
FIG. 4 is a flow diagram illustrating configuring an access point device so to establish a backhaul connection with an extender access point device, according to one or more aspects of the present disclosure.

FIG. 4 is a flow diagram illustrating an APD 2 establishing a BH to a network device, for example, an EAPD 3, prior to completing a configuration of the APD 2, according to one or more embodiments.

The APD 2, for example, a main APD, may be programmed with one or more instructions (for example, one or more computer-readable instructions) to perform the configuration of the APD 2 according to one or more embodiments, or may use its native software in some other example embodiments. In FIG. 4, it is assumed that the network devices include their respective controllers and their respective software stored in their respective memories, as discussed above in connection with FIGS. 1-3, which when executed by their respective controllers perform the functions and operations in accordance with the example embodiments of the present disclosure.

An APD 2 comprises a controller 26 that executes one or more computer-readable instructions, stored on a memory 302, that when executed perform one or more of the operations. In one or more embodiments, the one or more instructions can be one or more software applications, for example, one or more software 25. While the operations are presented in a certain order, the present disclosure contemplates that any one or more operations can be performed simultaneously, substantially simultaneously, repeatedly, in any order or not at all (omitted).

An APD 2 can begin initialization or configuration of the APD 2 at step 402, for example, based on an event, such as any of a power-on sequence, a boot-up sequence, onboarding, a re-boot sequence, any other initialization, or any combination thereof. During the initialization or configuration at step 402, the APD 2 can determine an initial BH channel at step 404. Determining the initial BH channel can comprise receiving one or more default configurations 354, for example, from a network resource 8, from a memory 302, as part of one or more configuration parameters received at step 410, or any combination thereof. In one or more embodiments, the APD 2 can automatically select the highest frequency radio. For example, an APD 2 can comprise a 3G radio, a 5G radio, and a 6G radio. The APD 2 can automatically select the 6G radio for establishing an initial BH channel with an EAPD 3, for example, a satellite APD, as the 6G radio is the highest frequency radio. In one or more embodiments, the APD 2 can use one or more default configuration parameters that indicate an initial radio, for example a 6 GHz radio 347, for establishing an initial BH connection with, for example, an EAPD 3.

At step 406, the APD 2 establishes an initial BH connection on the initial BH channel with the EAPD 3. The APD 2, at step 408, requests one or more configuration parameters 353 from a network resource 6 for use in initializing or configuring the APD 2. The APD 2, at step 410, can receive the one or more configuration parameters 353 from the network resource 6. The one or more configuration parameters 353 can comprise one or more FH configurations for application by the APD 2. Once the one or more configuration parameters 353 are received, the APD 2 can complete the initialization or configuration of the APD 2. While FIG. 4 illustrates steps 408-412 occurring after steps 404-406, the present disclosure contemplates that steps 408-416 can occur before, after, during, at the same time, or substantially the same time as steps 404-406.

At step 412, the APD 2 can process the one or more configuration parameters from step 410. For example, the APD 2 can apply the one or more configuration parameters or can cache the one or more configuration parameters and apply later, for example, at step 414.

At step 414, the APD 2 sends a configuration notification to a client device 4 associated with a user based on a status of the configuration. For example, the APD 2 can send the configuration notification based on at least one of the one or more configuration parameters, for example, that indicate a user, a client device 4, or both for receiving a configuration notification. The status can comprise any of one or more instructions to the user regarding completion percentage of the initialization or configuration of the APD 2 (such as that the initialization or configuration based on the one or more configuration parameters 353 is complete), the APD 2 is starting optimization of the BH channel connection, optimization of the BH channel will begin at a specified time or time period, the initialization or the configuration of the APD 2 will be completed at specified time or time period, any other instruction that notifies the user of a status of the initialization or the configuration, or any combination thereof.

At step 416, the APD 2 performs a BH optimization. The BH optimization can comprise determine an optimized BH channel for use in establishing a BH connection, for example, to replace or maintain the initial BH connection based on one or more network performance parameters. The one or more network performance parameters can comprise any of received signal strength (RSSI), bandwidth, throughput, latency, one or more packet loss indicators, interference, any other network or performance metrics, or any combination thereof. Once the optimized BH channel is determined, the APD 2 establishes an optimized backhaul connection with the EAPD3 and the initial BH channel is maintained or released, disconnected, or otherwise ended.

Figure 5:
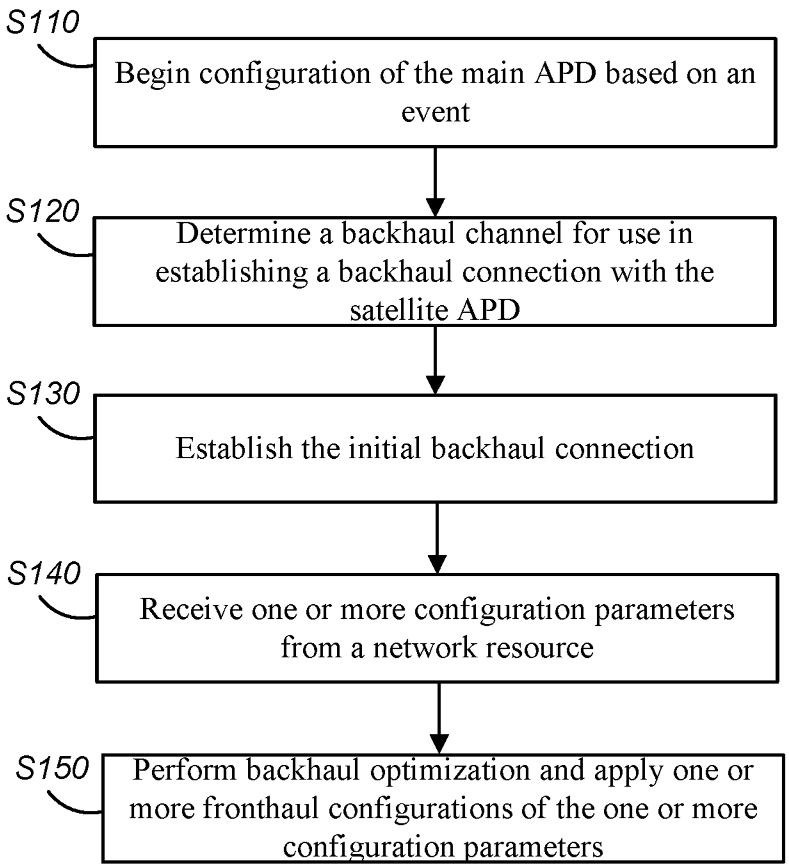
FIG. 5 is a flow chart illustrating a method for establishing a BH channel for an access point device in a network, according to one or more aspects of the present disclosure.

FIG. 5 is a flow chart illustrating a method for establishing a BH channel for an APD 2 in a network, according to one or more aspects of the present disclosure.

In one or more embodiments, an APD 2 may include a controller 26 that may be programmed with or to execute one or more instructions (for example, software or application 32) to perform steps for configuring an access point device 2 in a network, such as network 150, to initiate and establish a BH connection between the APD 2 and an EAPD 3. In FIG. 5, it is assumed that the network devices include their respective controllers and their respective software stored in their respective memories, as discussed above in reference to FIGS. 1-5, which when executed by their respective controllers perform the functions and operations in accordance with the example embodiments of the present disclosure.

The controller 26 executes one or more computer-readable instructions, stored in a memory, for example, a memory 24 or a memory 302 of an APD 2 that when executed perform one or more of the operations of steps S110-S150. In one or more embodiments, the one or more instructions may be one or more software applications, for example, a software 25 or a software 352 of an APD 2 respectively. While the steps S110-S150 are presented in a certain order, the present disclosure contemplates that any one or more steps can be performed simultaneously, substantially simultaneously, repeatedly, in any order or not at all (omitted).

At step S110, the main APD 2 begins configuration of the main APD 2 based on an event. The event can be any event that causes the main APD 2 to require a configuration, such as any of a power-on sequence, a boot-up sequence, onboarding, a re-boot sequence, any other initialization, or any combination thereof.

At step S120, the main APD 2 determines an initial BH channel for use in establishing a BH connection with a satellite APD 3. Determining the initial BH channel can comprise the main APD 2 receiving one or more default configuration parameters, and determining the BH channel based on at least one of the one or more default configuration parameters.

At step S130, the main APD 2 can establish the initial BH connection. The determining the initial BH channel can comprise receiving one or more default configurations 354 and basing the determining of the initial BH channel on at least one of the one or more default configurations 354. The one or more default configurations 354 can comprise an initial radio for establishing the backhaul connection.

At step S140, the main APD 2 receives one or more configuration parameters from a network resource 8. The one or more default configurations 354 can in the alternative or also be received from any of any other repository such as a memory 302, an externally connected storage system, included within or as part of one or more configuration parameters received during the initialization, or any combination thereof.

At step S150, the main APD 2 performs BH optimization and applies one or more fronthaul configuration of the one or more configuration parameters received at step S140. Performing the BH optimization can comprise the main APD 2 determining an optimized BH channel based on one or mor network performance parameters. In one or more embodiments, the initial BH channel is different from the optimized BH channel.

According to one or more example embodiments of inventive concepts disclosed herein, there are provided novel solutions for establishing a BH connection between a main APD and an EAPD. The novel solutions according to example embodiments of inventive concepts disclosed herein provide features that enhance, for example, configuration of home/residential network gateway (GW) devices, wireless access points (Wi-Fi® APs), Home Network Controller (HNC) devices, wireless routers, mesh networking nodes (for example, Wi-Fi® EasyMesh systems), and the like. By automatically selecting an initial BH channel, configuration or initialization of the main APD can continue without the delay due to the main APD waiting on the selection of the best channel and/or best radio for establishing the BH connection. The user is notified regarding the initialization or configuration and the selection of the BH channel. In this way, the user does not experience a delay in operation of the main APD or is provided with information so as to understand the delay in operation.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A main access point device (APD) for establishing a backhaul connection to a second APD in a network, the APD comprising:

a memory storing one or more computer-readable instructions;

a processor configured to execute the one or more computer-readable instructions stored on the memory to cause the main APD to:

begin configuration of the main APD based on an event;

determine a backhaul channel for use in establishing an initial backhaul connection with the second APD prior to completion of the configuration, the backhaul channel determined based on at least one default configuration parameter stored in the memory;

establish the initial backhaul connection using the determined backhaul channel;

apply one or more fronthaul configurations to connect to at least one client device using one or more configuration parameters received from a network resource; and send a configuration notification to the at least one client device, the notification indicating a status for the completion of the configuration of the main APD to a user associated with the client device.

2. The main APD of claim 1, wherein the processor is further configured to execute the one or more computer-readable instructions to cause the main APD to: receive one or more configuration parameters from a network resource.

3. The main APD of claim 1, wherein the processor is further configured to execute the one or more computer-readable instructions to cause the main APD to: perform backhaul optimization.

4. The main APD of claim 3, wherein the performing the backhaul optimization comprises: determining an optimized backhaul channel based on one or more network performance parameters.

5. The main APD of claim 4, wherein the initial backhaul channel is different from the optimized backhaul channel.

6. The main APD of claim 1, wherein the at least one default configuration parameter comprises an initial radio for establishing the backhaul connection.

7. The main APD of claim 6, wherein the initial radio is a radio operating at a frequency higher than any other radio in the main APD.

8. A method for a main access point device (APD) to establish a backhaul connection to a second APD in a network, the method comprising:

beginning configuration of the main APD based on an event;

determining a backhaul channel for use in establishing an initial backhaul connection with the second APD prior to completion of the configuration, the backhaul channel determined based on at least one default configuration parameter stored in the memory;

establishing the initial backhaul connection using the determined backhaul channel;

applying one or more fronthaul configurations to connect to at least one client device using one or more configuration parameters received from a network resource; and sending a configuration notification to the at least one client device, the notification indicating a status for the completion of the configuration of the main APD to a user associated with the client device.

9. The method of claim 8, further comprising: receiving one or more configuration parameters from a network resource.

10. The method of claim 8, further comprising: performing backhaul optimization.

11. The method of claim 10, wherein the performing the backhaul optimization comprises: determining an optimized backhaul channel based on one or more network performance parameters.

12. The method of claim 11, wherein the initial backhaul channel is different from the initial backhaul channel.

13. The method of claim 8, wherein the at least one default configuration parameter comprises an initial radio for establishing the backhaul connection.

14. The method of claim 13, wherein the initial radio is a radio operating at a frequency higher than any other radio in the main APD.

15. A non-transitory, computer-readable medium storing one or more computer-readable instructions for a main access point device (APD) to establish a backhaul connection to a second APD in a network, that when executed by a processor, cause the processor to perform one or more operations comprising:

beginning configuration of the main APD based on an event;

determining a backhaul channel for use in establishing an initial backhaul connection with the second APD prior to completion of the configuration, the backhaul channel determined based on at least one default configuration parameter stored in the memory;

establishing the initial backhaul connection using the determined backhaul channel;

applying one or more fronthaul configurations to connect to at least one client device using one or more configuration parameters received from a network resource; and sending a configuration notification to the at least one client device, the notification indicating a status for the completion of the configuration of the main APD to a user associated with the client device.

16. The non-transitory, computer-readable medium of claim 15, wherein the one or more computer-readable instructions when executed by the processor, further cause the processor to perform the one or more operations further comprising at least one of: receiving one or more configuration parameters from a network resource; and performing backhaul optimization.

17. The non-transitory, computer-readable medium of claim 16, wherein the performing the backhaul optimization comprises: determining an optimized backhaul channel based on one or more network performance parameters.

18. The non-transitory, computer-readable medium of claim 17, wherein the initial backhaul channel is different from the initial backhaul channel.

19. The non-transitory, computer-readable medium of claim 15, wherein the at least one default configuration parameter comprises an initial radio for establishing the backhaul connection.

20. The computer readable medium of claim 19, wherein the initial radio is a radio operating at a frequency higher than any other radio in the main APD.

* * * * *